United States Patent
Weng

(10) Patent No.: US 9,556,926 B1
(45) Date of Patent: Jan. 31, 2017

(54) ORIGINAL TYPE DAMPING-ADJUSTABLE SHOCK ABSORBER

(71) Applicant: MAX'S INDUSTRIAL CO., LTD., Tainan (TW)

(72) Inventor: Shu-Ping Weng, Tainan (TW)

(73) Assignee: Max's Industrial Co., Ltd., Tainan (TW)

( * ) Notice: Subject to any disclaimer, the term of this patent is extended or adjusted under 35 U.S.C. 154(b) by 0 days.

(21) Appl. No.: 14/795,994

(22) Filed: Jul. 10, 2015

(51) Int. Cl.
 *F16F 9/16* (2006.01)
 *F16F 9/53* (2006.01)
 *F16F 9/44* (2006.01)
 *F16F 9/18* (2006.01)

(52) U.S. Cl.
 CPC . *F16F 9/53* (2013.01); *F16F 9/16* (2013.01); *F16F 9/446* (2013.01); *F16F 9/182* (2013.01)

(58) Field of Classification Search
 CPC ............... F16F 9/16; F16F 9/44; F16F 9/443; F16F 9/446; F16F 9/182; F16F 9/185; B62K 2025/048
 USPC ... 188/282.2, 282.8, 316, 317, 319.1, 319.2, 188/322.15; 267/64.18
 See application file for complete search history.

(56) References Cited

U.S. PATENT DOCUMENTS

| | | | | | |
|---|---|---|---|---|---|
| 5,308,099 | A | * | 5/1994 | Browning | F16F 9/44 188/319.2 |
| 6,279,703 | B1 | * | 8/2001 | Mete | F16F 9/44 188/319.1 |
| 8,261,895 | B2 | * | 9/2012 | Murakami | F16F 9/461 188/313 |
| 2008/0230335 | A1 | * | 9/2008 | Furuya | B62K 25/08 188/315 |
| 2009/0277732 | A1 | * | 11/2009 | Trujillo | F16F 9/504 188/266.5 |
| 2010/0294605 | A1 | * | 11/2010 | Mochizuki | B62K 25/08 188/297 |

FOREIGN PATENT DOCUMENTS

JP 03168435 A * 7/1991
JP EP 2725258 A4 * 4/2015 ............. F16F 9/466

* cited by examiner

*Primary Examiner* — Thomas J Williams
(74) *Attorney, Agent, or Firm* — Rosenberg, Klein & Lee

(57) ABSTRACT

An original type damping-adjustable shock absorber is revealed. An adjustment rod is mounted into a through hole of a piston body while a knob is disposed on a top end of a main body of the adjustment rod and a tapered-end rod is connected to a bottom end of the main body. A tapered-head of the tapered-end rod is inserted into a channel under the through hole. An insertion hole is located at a wall of the piston body and communicated with the channel. The depth of the tapered-head of the tapered-end rod inserted into the channel can be adjusted so as to change resistance of hydraulic oil flowing through the channel and damping level of the shock absorber. Thus an original car runs smoothly over roads with various surfaces. Therefore features of the original car including a comfort rid and a sense of value are highlighted.

20 Claims, 5 Drawing Sheets

ORIGINAL TYPE DAMPING-ADJUSTABLE SHOCK ABSORBER

BACKGROUND OF THE INVENTION

Field of the Invention

The present invention relates to an original type shock absorber, especially to an original type damping-adjustable shock absorber whose damping level is adjustable according to road conditions. Thus an original type car is allowed to ride smoothly over roads with various surfaces.

Descriptions of Related Art

Refer to FIG. 5, an original type car shock absorber available now includes a tube 7 connected to an axle and filled with hydraulic oil. A piston 8 is mounted in the tube 7. One end of a piston rod 9 is connected to the piston 8 while the other end thereof is extended from the tube 7 to be connected to a car chassis. When the car is running over road bumps and vibrating severely, the piston 8 acts together with the moved piston rod 9. The frequency and amplitude of vibration are reduced by the hydraulic oil with buffering performance. Thereby effective shock absorption is achieved.

When the car is travelling over urban roads paved with asphalt, the road is smooth and the car is at a lower vibration level. Thus the vibration of small amplitude is eliminated by the original type shock absorber available now.

However, when the car is running to urban area, most of the roads in the urban area are bumpy and rough. The original type shock absorber with lower damping level is unable to work property and the car strongly due to large amplitude. The shock absorption performance is poor. Thus the driver and passengers fell uncomfortable and the car is unable to provide a comfortable ride and a sense of value.

The damping level of the original type shock absorber is unable to be adjusted according to road conditions. There is room for improvement and a need to provide a novel original type damping-adjustable shock absorber.

SUMMARY OF THE INVENTION

Therefore it is a primary object of the present invention to provide an original type damping-adjustable shock absorber whose damping level is adjustable according to road conditions. Thus an original type car is allowed to travel smoothly over various road surfaces.

In order to achieve the above object, an original type damping-adjustable shock absorber according to the present invention includes a piston rod formed by a piston body and an adjustment rod. The piston body consists of a through hole penetrating a center thereof, two inner threaded portions formed on a top end and a bottom end of the through hole respectively, a throttle engaged with the inner threaded portion on the bottom end of the through hole, and an insertion hole located at a wall of the piston body and communicated with a channel. The channel is passed through the center of the throttle.

The adjustment rod includes an elastic member, a tapered-end rod, a main body, a shaft sleeve, an assembly base, and a knob, all mounted into the through hole of the piston body in sequence. The knob is formed by a grip portion and a polygonal portion.

An outer threaded portion is formed on an outer wall of the shaft sleeve and used for being engaged with the inner threaded portion on the top end of the through hole of the piston body. A polygonal hole is formed on a center of the shaft sleeve and is assembled with the polygonal portion on a connecting rod of the knob.

A top end of the main body of the adjustment rod is connected to and against a bottom end of the shaft sleeve while a bottom end of the main body of the adjustment rod is connected to and against a top end of the tapered-end rod. The elastic member is fitted over a tapered-head on the bottom end of the tapered-end rod 22 while the other end of the elastic member s against the throttle. The tapered-head is inserted into the channel.

The depth of the tapered-head of the tapered-end rod inserted into the channel can be adjusted according to road conditions. Thus the resistance of hydraulic oil flowing through the channel is changed. Therefore the original car can ride smoothly over roads with different surface and features of the original car including a comfort rid and a sense of value are highlighted.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical features and effects of the present invention, please refer to the figures and the following embodiments.

Figure 1:
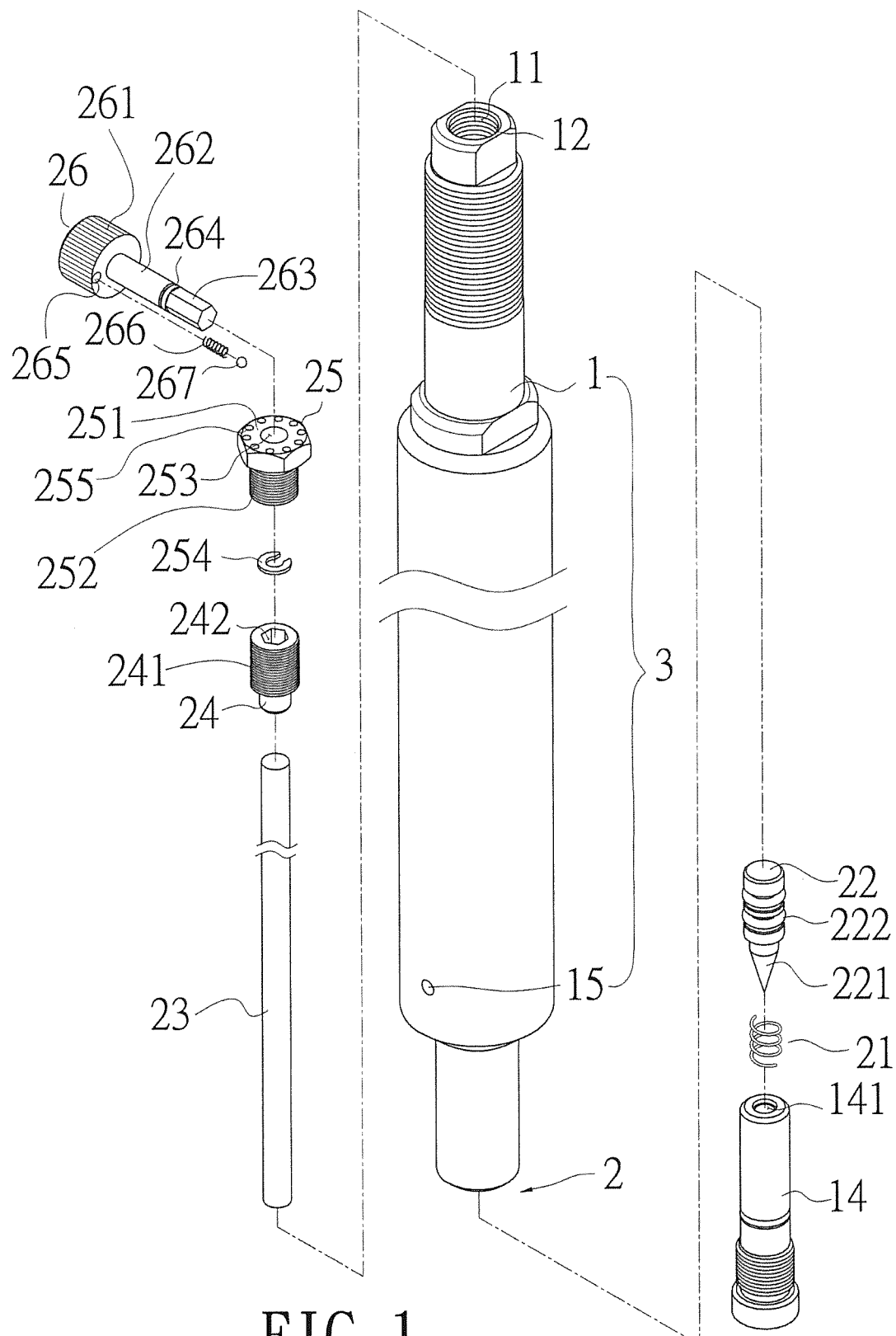
FIG. 1 is an explosive view of a piston rod of an original type shock absorber according to the present invention.
Figure 2:
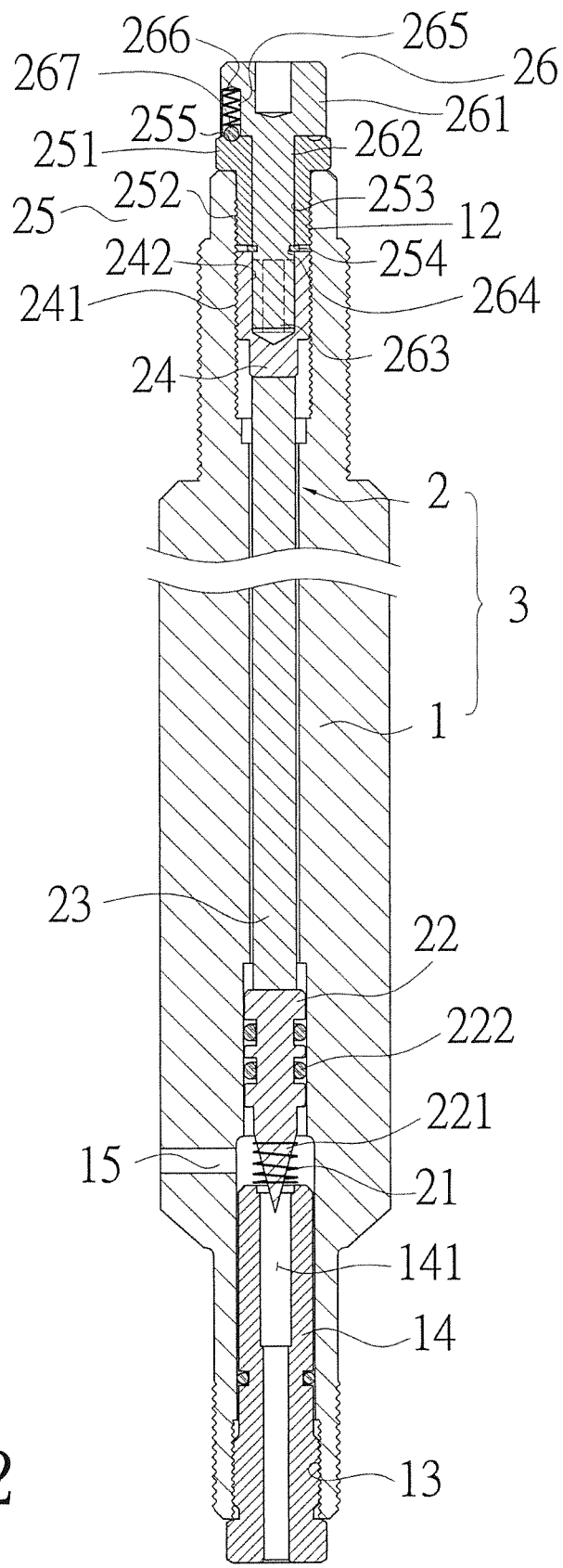
FIG. 2 is a longitudinal sectional view of a piston rod of an original type shock absorber according to the present invention.

Refer to FIG. 1. and FIG. 2, a piston rod 3 of an original type damping-adjustable shock absorber includes a piston body 1 and an adjustment rod 2.

The piston body 1 consists of a through hole 11 penetrating a center thereof, two inner threaded portions 12, 13 formed on a top end and a bottom end of the through hole 11 respectively, a throttle 14 engaged with the inner threaded portion 13 on the bottom end of the through hole 11, and an insertion hole 15 located at a wall of the piston body 1. A channel 141 is passed through the center of the throttle 14. The insertion hole 15 is communicated with the channel 141.

The adjustment rod 2 is composed of an elastic member 21, a tapered-end rod 22, a main body 23, a shaft sleeve 24, an assembly base 25, and a knob 26. The above components are mounted into the through hole 11 of the piston body 1 in turn. The knob 26 is mainly formed by a grip portion 261, a connecting rod 262 connected to and extended from the grip portion 261, a polygonal portion 263 formed on a bottom end of the connecting rod 262, a locking groove 264 formed on the connecting rod 262 and located on top of the polygonal portion 263, a receiving hole 265 arranged at a bottom surface of the grip portion 261, an elastic body 266 and a ball 267. The elastic body 266 and the ball 267 are mounted in the receiving hole 265.

An outer threaded portion 252 is connected to and extended from an end head 251 of the assembly base 25. The outer threaded portion 252 is engaged with the inner threaded portion 12 on the top end of the through hole 11. An insertion hole 253 is formed at the center of the assembly base 25, allowing the connecting rod 262 of the knob 26 passed therethrough. The assembly base 25 further includes a locking ring 254 thereunder. The locking ring 254 is locked with the locking groove 264 on the connecting rod 262 so as to integrate the assembly base 25 with the knob 26. A plurality of mounting holes 255 is disposed on the end head 251 of the assembly base 25 and located around the insertion hole 253. The ball 267 is mounted in one of the mounting holes 255.

An outer threaded portion 241 is formed on an outer wall of the shaft sleeve 24 and used for being engaged with the inner threaded portion 12 on the top end of the through hole 11 of the piston body 1. A polygonal hole 242 is formed on a center of the shaft sleeve 24 and is assembled with the polygonal portion 263 on the connecting rod 262 of the knob 26.

A top end of the main body 23 is connected to and against a bottom end of the shaft sleeve 24 while a bottom end of the main body 23 is connected to and against a top end of the tapered-end rod 22. The elastic member 21 is fitted over a tapered-head 221 on the bottom end of the tapered-end rod 22 while the other end of the elastic member 21 is against the throttle 14. The tapered-head 221 is inserted into the channel 141. Then a washer 222 is fitted over the tapered-end rod 22.

Figure 3:
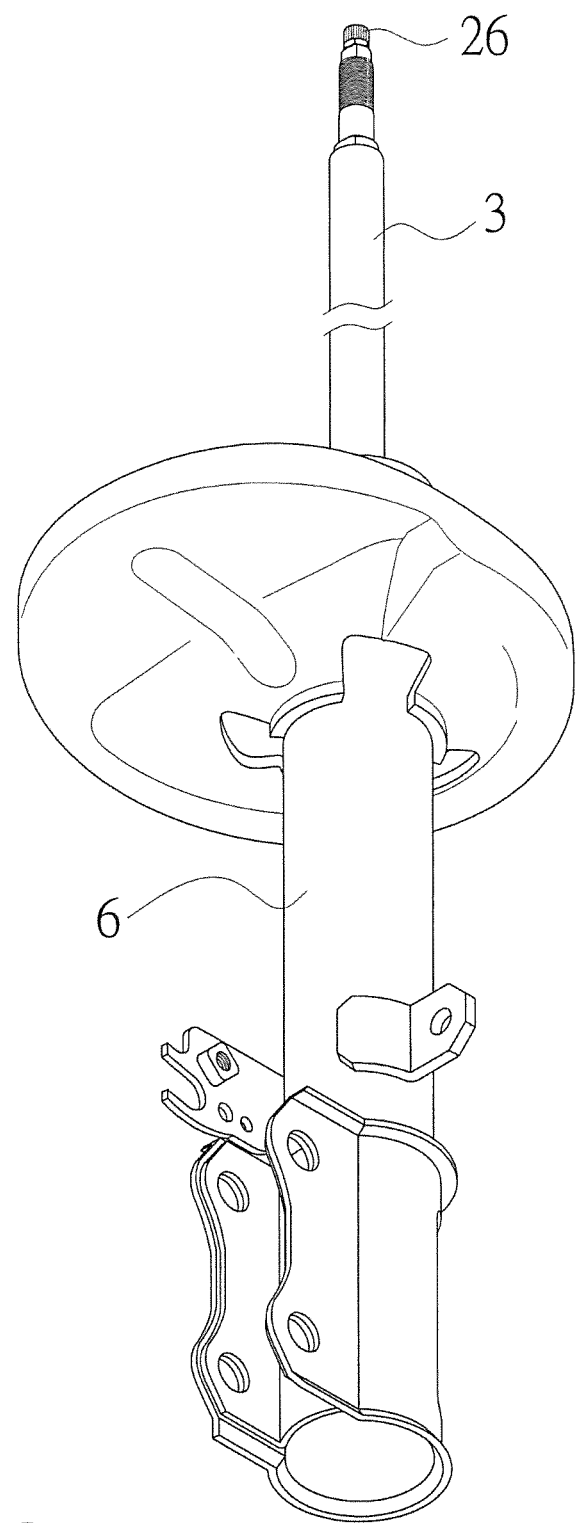
FIG. 3 is a perspective view of an original type shock absorber according to the present invention.
Figure 4:
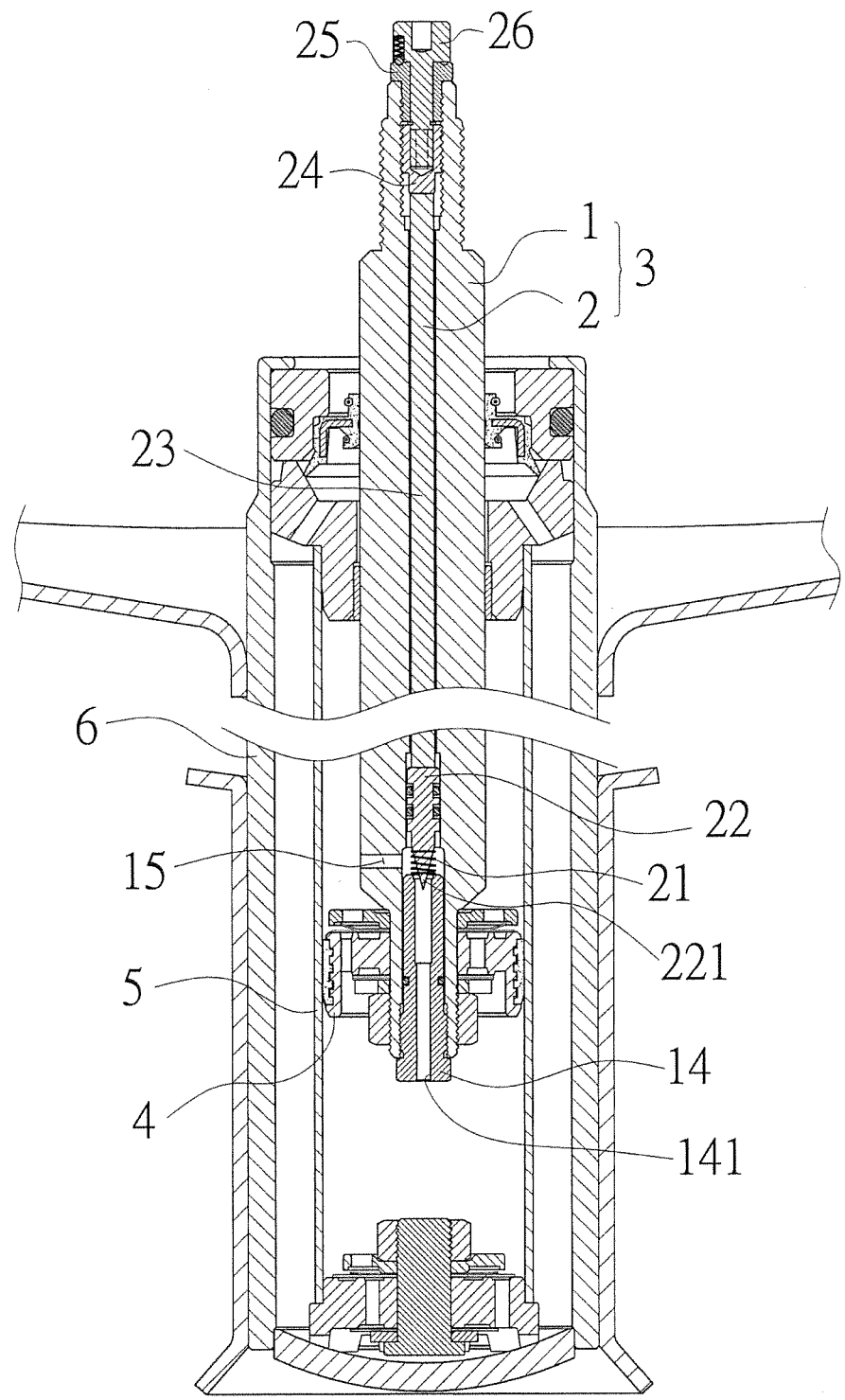
FIG. 4 is a longitudinal sectional view of an original type shock absorber according to the present invention.
Figure 5:
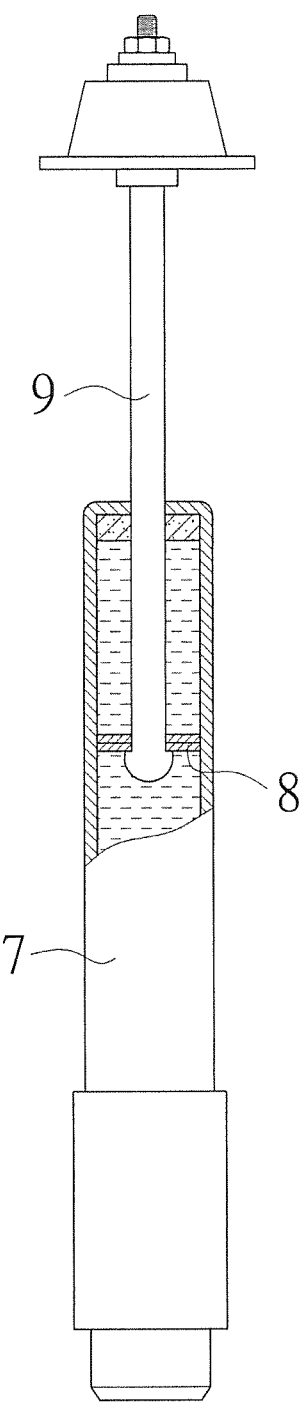
FIG. 5 is a longitudinal sectional view of a prior art.

As shown in FIG. 3 and FIG. 4, while in use, the piston body 1 and the adjustment rod 2 are assembled to form the piston rod 3. Then a piston 4 is connected to a bottom end of the piston rod 3. The piston rod 3 and the piston 4 connected are mounted into a cylinder 5 already filled with hydraulic oil. Next the cylinder 5, the piston 4 and the piston rod 3 are mounted into an outer tube 6 to form the shock absorber.

The outer tube 6 of the original type shock absorber is connected to an axle of an original car while the piston rod 3 is assembled with a chassis of the original car. A part of the knob 26 is extended from the chassis of the original car, allowing users to rotate and adjust.

When the original car is running on urban roads, most of the road surface is smooth. Thus the shock absorber is adjusted to have low damping for providing a soft ride. While the car is travelling over the flat road with few bumps, the shock absorber absorbs the vibration and impact energy to provide the driver and passengers a comfort ride.

When the original car is travelling over suburban area or mountain area with bumpy roads, the original type shock absorber of the present invention is adjusted to have firm damping level. While in use, the knob 26 is rotated to drive and further rotate the shaft sleeve 24 connected. By the outer threaded portion 241 engaged with the inner threaded portion 12 of the through hole 11 of the piston body 1, the shaft sleeve 24 is rotated and moved to push the main body 23 thereunder to move downward. Thus the tapered-end rod 22 on the bottom end of the main body 23 is also moved downward and the tapered-head 221 is getting deeper into the channel 141 of the throttle 14. The gap between the tapered-head 221 of the tapered-end rod 22 and the channel 141 of the throttle 14 is reduced so that the resistance of the hydraulic oil flowing through the channel 141 of the throttle 14 is increased. The damping factor of the shock absorber is increased. While the car is running on the bumpy road, the car body will not have excessive vibrations due to high damping level. The ride comfort in all seats is improved while the car is travelling over rough roads on suburban or mountain area. Thus both the driver and the passengers feel a sense of value of the original car.

Moreover, the shock absorber is adjusted to the normal state by rotating the knob 26 reversely while the car is travelling on the city roads. Now the knob 26 drives the shaft sleeve 24 to rotate and move upward in the through hole 11 of the piston body 1. Thus the main (rod) body 23 and the tapered-end rod 22 against the bottom end of the shaft sleeve 24 are pushed against by the elastic member 21 on the bottom end of the tapered-end rod 22 to move upward. Then the tapered-head 221 is getting away from the channel 141 of the throttle 14. The gap between the tapered-head 221 of the tapered-end rod 22 and the channel 141 of the throttle 14 is re so that resistance of hydraulic oil flowing through the channel 141 of the throttle 14 is reduced. The damping factor of the shock absorber is increased. With the low damping level, the shock absorber effectively eases tiny vibrations transmitted from the road surface.

In addition, the knob 26 will not rotate improperly due to some factors such as vibration because the ball 267 on the bottom thereof is braked by the mounting hole 255 on the end head 251 of the assembly base 25. When a user applies a force to the knob 26 for rotating the knob 26, the ball 267 on the bottom thereof is driven to move. By extension and contraction of the elastic body 266 against the ball 267, the ball 267 is moved from one of the mounting holes 255 of the assembly base 25 to another mounting hole 255 of the assembly base 25 until a click sound is heard. The user can also learn the lifting range/amplitude of the adjustment rod 2 driven by the knob 26 according to the number of the click sounds.

In summary, the absorber shock of the present invention has following advantages:

1. The damping level of the original type shock absorber of the present invention can be adjusted according to surface shape of the roads. While travelling over the rough roads on suburban or mountain area, the resistance of the hydraulic oil flowing through the channel is increased by the adjustment rod. Thus the strong vibration of the car body produced by resonance can be reduced and the car is running smoothly over the bumpy roads on suburban or mountain area. By the shock absorber with better damping effect, features of the original car including the comfort rid and the sense of value are highlighted.

2. In the original type shock absorber of the present invention, the improper rotation of the knob is avoided by the ball on the bottom of the knob mounted in one of the mounting holes. The ball is moved from the one of the mounting holes to another mounting hole when the knob until a click sound is heard. The lifting range/amplitude of the adjustment rod driven by the knob is learned according to the number of the click sounds.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A damping-adjustable shock absorber comprising:
a piston rod having a piston body with a through hole and an adjustment rod mounted into the through hole of the piston body; a knob connected to a top end of a main body of the adjustment rod and a tapered-end rod set on a bottom end of the main body of the adjustment rod while a tapered-head of the tapered-end rod is inserted into a channel formed on a bottom of the through hole; an insertion hole located at a wall of the piston body and communicated with the channel;

a piston that is connected to a bottom end of the piston rod; and a cylinder filled with hydraulic oil and mounted with the piston and a part of the piston rod therein;

wherein the adjustment rod further includes a shaft sleeve arranged between the knob and the main body of the adjustment rod; a bottom end of the shaft sleeve is connected to and against the main body of the adjustment rod; the shaft sleeve is disposed with a polygonal hole concavely on a top end thereof and an outer threaded portion therearound; the knob includes a grip portion exposed and projecting from the piston body, a connecting rod connected to and extended from the grip portion, and a polygonal portion formed on the connecting rod and mounted to the polygonal hole of the shaft sleeve; the outer threaded portion is engaged with an inner threaded portion formed in the through hole of the piston body.

2. The device as claimed in claim 1, wherein the adjustment rod further includes an assembly base arranged between the knob and the piston body; the knob includes the grip portion exposed and projecting from the piston body, the connecting rod connected to the grip portion and the main body of the adjustment rod, and a receiving hole disposed on a bottom side of the grip portion; an elastic body and a ball are mounted in the receiving hole in turn; an insertion hole is formed at a center of the assembly base and used for allowing the connecting rod of the knob passed therethrough; a plurality of mounting holes is disposed around the insertion hole of the assembly base and used for mounting the ball therein.

3. The device as claimed in claim 2, wherein the adjustment rod further includes an elastic member that is arranged between the tapered-head of the tapered-end rod and the channel.

4. The device as claimed in claim 3, wherein a washer is fitted over the tapered-end rod.

5. The device as claimed in claim 4, wherein a throttle is disposed on a bottom end of the through hole of the piston body and the channel is formed on a center of the throttle and passing through the throttle.

6. The device as claimed in claim 5, wherein the damping-adjustable shock absorber further includes an outer tube for mounting the cylinder, the piston and a part of the piston rod therein.

7. The device as claimed in claim 1, wherein the adjustment rod further includes an elastic member that is arranged between the tapered-head of the tapered-end rod and the channel.

8. The device as claimed in claim 7, wherein a washer is fitted over the tapered-end rod.

9. The device as claimed in claim 8, wherein a throttle is disposed on a bottom end of the through hole of the piston body and the channel is formed on a center of the throttle and passing through the throttle.

10. The device as claimed in claim 9, wherein the damping-adjustable shock absorber further includes an outer tube for mounting the cylinder, the piston and a part of the piston rod therein.

11. The device as claimed in claim 1, wherein a throttle is disposed on a bottom end of the through hole of the piston body and the channel is formed on a center of the throttle and passing through the throttle.

12. The device as claimed in claim 11, wherein the damping-adjustable shock absorber further includes an outer tube for mounting the cylinder, the piston and a part of the piston rod therein.

13. The device as claimed in claim 12, wherein a washer is fitted over the tapered-end rod.

14. The device as claimed in claim 1, wherein the damping-adjustable shock absorber further includes an outer tube for mounting the cylinder, the piston and a part of the piston rod therein.

15. A damping-adjustable shock absorber comprising:

a piston rod having a piston body with a through hole and an adjustment rod mounted into the through hole of the piston body; a knob connected to a top end of a main body of the adjustment rod and a tapered-end rod set on a bottom end of the main body of the adjustment rod while a tapered-head of the tapered-end rod is inserted into a channel formed on a bottom of the through hole; an insertion hole located at a wall of the piston body and communicated with the channel;

a piston that is connected to a bottom end of the piston rod; and a cylinder filled with hydraulic oil and mounted with the piston and a part of the piston rod therein;

wherein the adjustment rod further includes an assembly base arranged between the knob and the piston body; the knob includes a grip portion exposed and projecting from the piston body, a connecting rod connected to the grip portion and the main body of the adjustment rod, and a receiving hole disposed on a bottom side of the grip portion; an elastic body and a ball are mounted in the receiving hole in turn; an insertion hole is formed at a center of the assembly base and used for allowing the connecting rod of the knob passed therethrough; a plurality of mounting holes is disposed around the insertion hole of the assembly base and used for mounting the ball therein.

16. The device as claimed in claim 15, wherein the adjustment rod further includes an elastic member that is arranged between the tapered-head of the tapered-end rod and the channel.

17. The device as claimed in claim 16, wherein a washer is fitted over the tapered-end rod.

18. The device as claimed in claim 17, wherein a throttle is disposed on a bottom end of the through hole of the piston body and the channel is formed on a center of the throttle and passing through the throttle.

19. The device as claimed in claim 15, wherein a throttle is disposed on a bottom end of the through hole of the piston body and the channel is formed on a center of the throttle and passing through the throttle.

20. The device as claimed in claim 15, wherein the damping-adjustable shock absorber further includes an outer tube for mounting the cylinder, the piston and a part of the piston rod therein.

* * * * *